US012465535B2

(12) United States Patent
Sukumaran et al.

(10) Patent No.: US 12,465,535 B2
(45) Date of Patent: Nov. 11, 2025

(54) LOAD CELL ASSEMBLY FOR A PATIENT SUPPORT APPARATUS

(71) Applicant: Stryker Corporation, Kalamazoo, MI (US)

(72) Inventors: Sujay Sukumaran, Portage, MI (US); Mehmet Ilker Koç, Kayseri (TR); Berkay Güncan, Kayseri (TR); Michael John Olson, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 29 days.

(21) Appl. No.: 18/572,492

(22) PCT Filed: Oct. 13, 2022

(86) PCT No.: PCT/US2022/046506
§ 371 (c)(1),
(2) Date: Dec. 20, 2023

(87) PCT Pub. No.: WO2023/064430
PCT Pub. Date: Apr. 20, 2023

(65) Prior Publication Data

US 2024/0299225 A1 Sep. 12, 2024

Related U.S. Application Data

(60) Provisional application No. 63/255,127, filed on Oct. 13, 2021.

(51) Int. Cl.
*A61G 7/05* (2006.01)
*A61G 7/012* (2006.01)
*A61G 7/018* (2006.01)

(52) U.S. Cl.
CPC ............ *A61G 7/0527* (2016.11); *A61G 7/012* (2013.01); *A61G 7/018* (2013.01); *A61G 2203/44* (2013.01)

(58) Field of Classification Search
CPC .......... A61G 7/0527; A61G 2007/0527; A61G 7/00; A61G 7/002; A61G 7/005;
(Continued)

(56) References Cited

U.S. PATENT DOCUMENTS 5,279,010 A 1/1994 Ferrand et al.
6,381,827 B1 5/2002 Steinbock
(Continued)

FOREIGN PATENT DOCUMENTS

JP 6637715 B2 1/2020
JP 6768915 B2 10/2020

OTHER PUBLICATIONS

English language abstract and machine-assisted English translation for JP 6637715 B2 extracted from espacenet.com database on Dec. 22, 2023, 13 pages.
(Continued)

*Primary Examiner* — David E Sosnowski
(74) *Attorney, Agent, or Firm* — Howard & Howard Attorneys PLLC

(57) ABSTRACT

A patient support apparatus includes a support structure including a base, an intermediate frame, and a patient support deck and a lift mechanism for moving the patient support deck relative to the base. A plurality of load cells are interposed between the lift mechanism and the support structure to measure load about the patient support surface. Each of the plurality of load cell assemblies includes a body, a bushing, and a shaft. The bushing is configured to be received by the body and defines opposing tapered regions and a central region. The shaft is configured to be received by the bushing and defines a reduced diameter region arranged to engage the central region of the bushing to urge the shaft into alignment with bushing and to permit limited pivoting and translational movement between the shaft and
(Continued)

the bushing in response to load shifting between the plurality of load cell assemblies.

20 Claims, 11 Drawing Sheets

(58) Field of Classification Search
CPC ........ A61G 7/015; A61G 7/012; A61G 7/018; A61G 2203/32; A61G 2203/34; A61G 2203/44; A61G 13/02; A61G 13/04; A61G 13/06; A61G 7/108
See application file for complete search history.

(56) References Cited

U.S. PATENT DOCUMENTS

| | | | | |
|---|---|---|---|---|
| 6,820,294 | B2 | 11/2004 | Shiery et al. | |
| 6,822,571 | B2 * | 11/2004 | Conway | A61B 5/1126 177/144 |
| 6,877,572 | B2 * | 4/2005 | Vogel | A61G 7/0528 180/19.1 |
| 7,176,391 | B2 | 2/2007 | Metz et al. | |
| 7,241,956 | B1 | 7/2007 | Stimpson | |
| 7,395,564 | B2 | 7/2008 | McDaniel et al. | |
| 7,472,439 | B2 | 1/2009 | Lemire et al. | |
| 8,024,980 | B2 | 9/2011 | Arms et al. | |
| 8,069,514 | B2 | 12/2011 | Poulos et al. | |
| 10,555,852 | B2 * | 2/2020 | Kubiak | A61G 7/0528 |
| 10,940,065 | B2 | 3/2021 | Childs et al. | |
| 11,304,865 | B2 * | 4/2022 | Furman | A61G 7/08 |
| 12,251,345 | B2 * | 3/2025 | Cerny | A61G 7/015 |
| 12,336,941 | B2 * | 6/2025 | Zerhusen | A61G 7/018 |
| 2005/0028281 | A1 | 2/2005 | Ooyama et al. | |
| 2010/0257672 | A1 | 10/2010 | Poulos et al. | |
| 2014/0237721 | A1 | 8/2014 | Lemire et al. | |
| 2015/0300872 | A1 | 10/2015 | Hirose et al. | |
| 2016/0128610 | A1 | 5/2016 | Kostic et al. | |
| 2017/0143566 | A1 | 5/2017 | Elku et al. | |
| 2018/0303687 | A1 | 10/2018 | Moreno et al. | |
| 2019/0008708 | A1 | 1/2019 | Moreno et al. | |
| 2019/0159949 | A1 | 5/2019 | Johnson et al. | |
| 2020/0060907 | A1 | 2/2020 | Childs et al. | |
| 2021/0177679 | A1 | 6/2021 | St. John et al. | |
| 2023/0338213 | A1 | 10/2023 | Bartley et al. | |

OTHER PUBLICATIONS

English language abstract and machine-assisted English translation for JP 6768915 B2 extracted from espacenet.com database on Dec. 22, 2023, 12 pages.

International Search Report for Application No. PCT/US2021/034393 dated Sep. 21, 2021, 1 page.

International Search Report for Application No. PCT/US2022/046506 dated Jan. 25, 2023, 1 page.

* cited by examiner

FIG. 7A
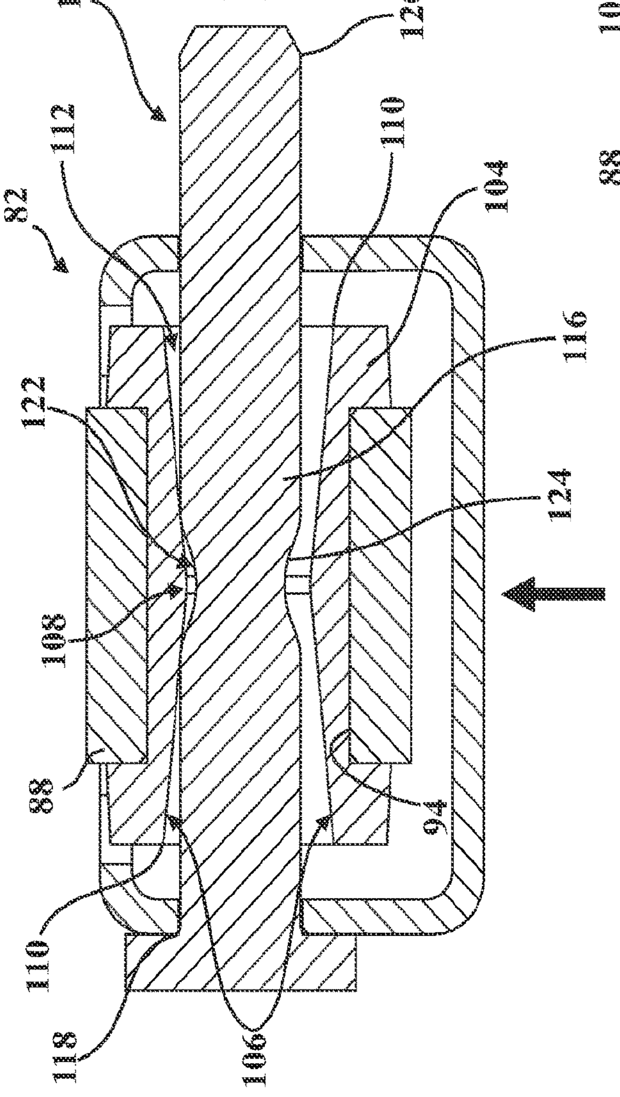
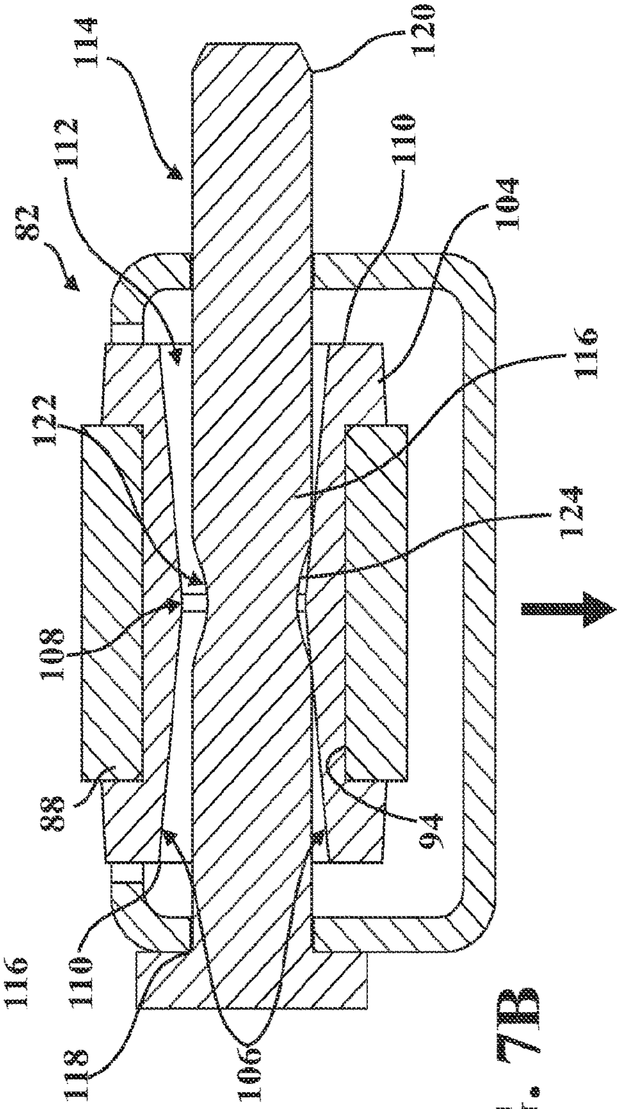
FIG. 7B

LOAD CELL ASSEMBLY FOR A PATIENT SUPPORT APPARATUS

CROSS-REFERENCE TO RELATED APPLICATION

The subject patent application claims priority to and all the benefits of U.S. Provisional Patent Application No. 63/255,127, filed on Oct. 13, 2021, the disclosure of which is hereby incorporated by reference in its entirety.

BACKGROUND

A patient support apparatus, such as a hospital bed, facilitates care of patients in a health care setting. A conventional patient support apparatus includes a base, an intermediate frame, a patient support deck upon which the patient is supported, and a lift mechanism for lifting and lowering the intermediate frame relative to the base. In certain types of patient support apparatuses, a plurality of load cells may be provided for measuring the patient's weight or for detecting the patient's position or movement. It will be appreciated that it is desirable for the load cells to be able to repeatably and reliably detect patient weight, movement, and the like. Depending on the specific configuration of the patient support apparatus, the load cells may be arranged, positioned, or otherwise configured in ways that make repeatable, high accuracy measurements difficult to achieve. For example, because of things like manufacturing inconsistencies, tolerance stack up, wear, and the like, the adjustment of deck sections of the patient support deck and/or the lift mechanism, and/or patient weight shifting about the patient support deck (e.g., moving from a lowered, flat position to a Trendelenburg position) may potentially lead to temporary binding or otherwise inaccurate readings from one or more load cells.

A patient support apparatus configured to overcome one or more of the aforementioned disadvantages is desired.

SUMMARY

One aspect includes a patient support apparatus including a support structure. The support structure includes a base arranged for movement about floor surfaces, an intermediate frame, and a patient support deck operatively attached to the intermediate frame and defining a patient support surface. The patient support apparatus also includes a lift mechanism configured to move the patient support deck between a plurality of vertical configurations relative to the base. The patient support apparatus further includes a plurality of load cell assemblies interposed between the support structure and the lift mechanism to measure load about the patient support surface. The plurality of load cell assemblies each respectively include a body operatively attached to one of the support structure and the lift mechanism and defining a bushing bore, a bushing arranged in the bushing bore and defining opposing tapered regions and a central region disposed between the tapered regions, and a shaft operatively attached to the other of the support structure and the lift mechanism. The shaft is configured to be received by the bushing and defining a reduced diameter region arranged to engage the central region of the bushing to urge the reduced diameter region of the shaft into alignment with the central region of the bushing and to permit limited pivoting and translational movement between the shaft and the bushing in response to load shifting between the plurality of load cell assemblies.

The patient support apparatus may further include a weigh frame interposed between the support structure and the lift mechanism, with each of the plurality of load cell assemblies operatively attached to the weigh frame. Each of the plurality of load cell assemblies may further include a mounting bracket coupled to the body of the load cell assembly, the mounting bracket configured to operatively attach the load cell assembly to one of the support structure, the lift mechanism, and the weigh frame.

Another aspect includes a load cell assembly configured to be interposed between a first mounting portion and a second mounting portion of a patient support apparatus. The load cell assembly also includes a body having a first portion configured to be operatively attached to the first mounting portion of the patient support apparatus and a second portion defining a bushing bore. The load cell assembly also includes a bushing arranged in the bushing bore and defining a pair of side openings and a shaft passage extending between the pair of side openings with a central region located along the shaft passage between the pair of side openings, where each of the pair of side openings defines a first diameter and the central region of the shaft passage defines a second diameter, the second diameter being smaller than the first diameter. The load cell assembly further includes a shaft extending along a shank between a first shank end and a second shank end, the shaft configured to be received by the bushing and operatively attached to the second mounting portion of the patient support apparatus, the shaft defining a reduced diameter region that is arranged between the first shank end and the second shank end to engage the central region of the bushing to urge the reduced diameter region of the shaft into alignment with the central region of the bushing and to permit limited pivoting and translational movement between the shaft and the bushing in response to load shifting on the patient support apparatus.

BRIEF DESCRIPTION OF THE DRAWINGS

FIG. 7A-7D are cross-sectional views of the load cell assembly coupled to a mounting portion of the patient support apparatus and in various misaligned configurations.

DETAILED DESCRIPTION

Figure 1:
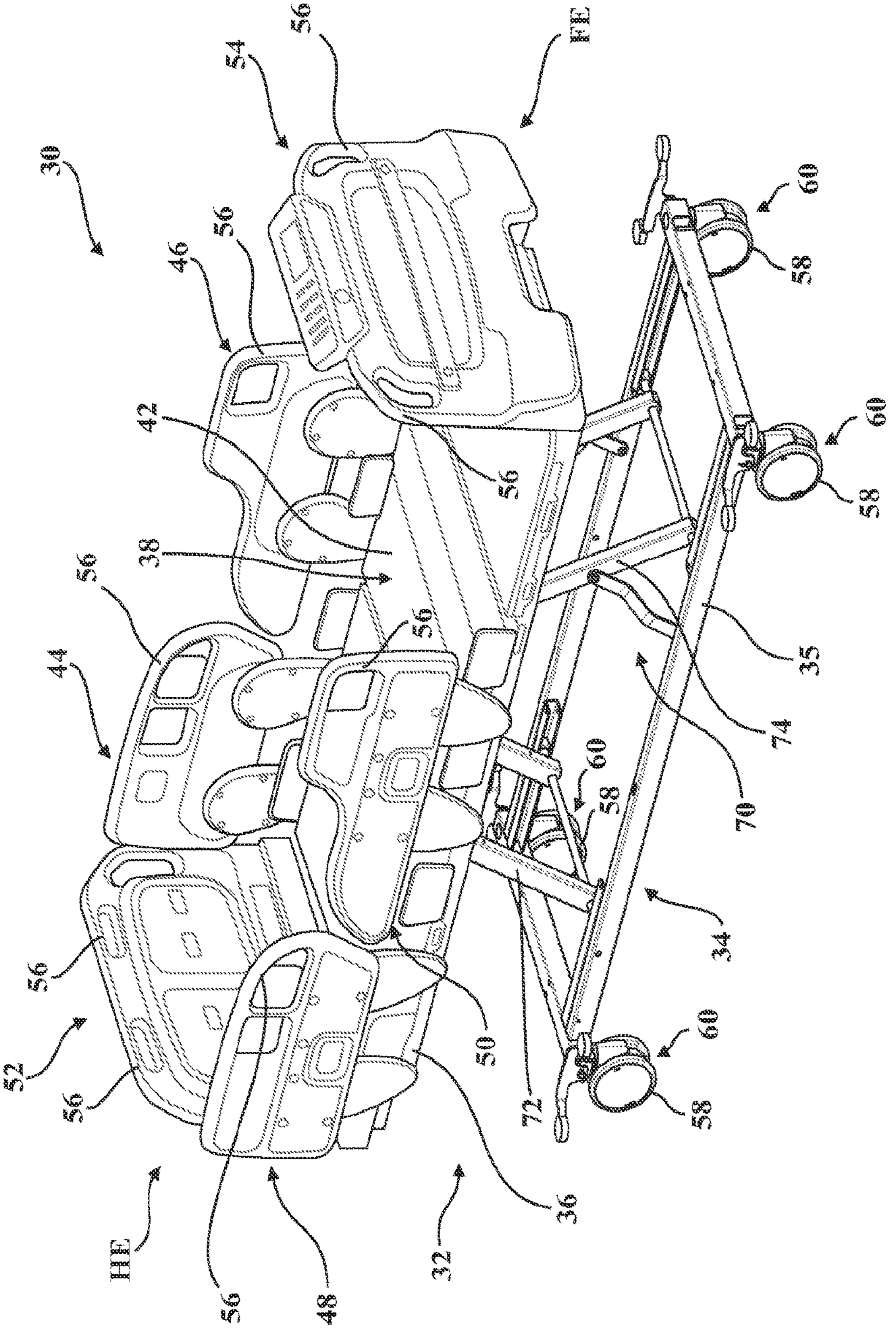
FIG. 1 is a perspective view of a patient support apparatus.

Referring to FIG. 1, a patient support apparatus 30 is shown for supporting a patient in a health care setting. The patient support apparatus 30 illustrated in FIG. 1 is a hospital bed. In other versions, however, the patient support apparatus 30 may be a stretcher, cot, table, wheelchair, or similar apparatus utilized in the care of a patient.

A support structure 32 provides support for the patient. The support structure 32 illustrated in FIG. 1 generally includes a base 34 and an intermediate frame 36. The base 34 has or otherwise is defined by a base frame 35. The intermediate frame 36 is spaced above the base frame 35 in FIG. 1. The support structure 32 also includes a patient support deck 38 operatively attached to the intermediate frame 36. The patient support deck 38 may include several sections, some of which are capable of articulating (e.g., pivoting) relative to the intermediate frame 36, such as a fowler section, a seat section, a thigh section, and a foot section. The patient support deck 38 provides a patient support surface 42 upon which the patient is supported. In some configurations, a mattress (not shown) is disposed on the patient support deck 38 during use. The mattress may include a secondary patient support surface upon which the patient is supported. The base 34, intermediate frame 36, patient support deck 38, and patient support surface 42 each have a head end HE and a foot end FE corresponding to designated placement of the patient's head and feet on the patient support apparatus 30. The construction of the support structure 32 may take on any known or conventional design and is not limited to that specifically set forth above. In addition, the mattress may be omitted in certain versions, such that the patient rests directly on the patient support surface 42.

In some configurations, side rails 44, 46, 48, 50 may be coupled to the support structure 32. A first side rail 44 is positioned at a right head end of the patient support deck 38. A second side rail 46 is positioned at a right foot end of the intermediate frame 36. A third side rail 48 is positioned at a left head end of the patient support deck 38. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In some configurations, the patient support apparatus 30 may not include any side rails.

Additionally, a headboard 52 and a footboard 54 may be coupled to the intermediate frame 36. In some versions, when the headboard 52 and footboard 54 are included, the headboard 52 and footboard 54 may be coupled to other locations on the patient support apparatus 30, such as the base 34. In some versions, the patient support apparatus 30 does not include the headboard 52 and/or the footboard 54. Further, in some configurations, caregiver interfaces 56, such as handles, may be integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Wheels 58 may be coupled to the base 34 to facilitate transport about floor surfaces. The wheels 58 may be arranged in each of four quadrants of the base 34 adjacent to corners of the base 34. In the version shown in FIG. 1, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some versions, the wheels 58 are not caster wheels and may be non-steerable, steerable, non-powered, powered, or combinations thereof. Additional wheels are also contemplated. For example, the patient support apparatus 30 may include four non-powered, non-steerable wheels, along with one or more powered wheels. In some cases, the patient support apparatus 30 may not include any wheels. In some versions, one or more auxiliary wheels (powered or non-powered), which are movable between stowed positions and deployed positions, may be coupled to the support structure 32.

The patient support apparatus 30 includes a lift mechanism 70 that operates to lift and lower the intermediate frame 36 and/or the patient support deck 38 relative to the base 34. The lift mechanism 70 is configured to move the intermediate frame 36 and/or the patient support deck 38 between a plurality of vertical configurations relative to the base 34, or to any desired position in between. Any suitable lift mechanism 70 capable of moving the intermediate frame 36 and/or the patient support deck 38 between a plurality of vertical configurations relative to the base 34 is contemplated.

For example, in some configurations, the lift mechanism 70 may include a head end lift and a foot end lift. The head end lift may be arranged to lift or lower the head end of the intermediate frame 36 and/or the patient support deck 38 relative to the base 34. The foot end lift may be arranged to lift or lower the foot end of the intermediate frame 36 and/or the patient support deck 38 relative to the base 34. Each of the head end lift and the foot end lift may include one or more actuators (not shown) to actuate the lifts. The lifts may be separately and independently operable such that the intermediate frame 36 and/or the patient support deck 38 can be placed in a variety of patient positions (such as a Trendelenburg position) in which the head end and the foot end are at different heights relative to the base 34.

Additionally, in some configurations, the lifts may be the same form as each other, or may have different respective forms. For instance, one of the lifts may be a crank-type mechanism or scissor-type mechanism, while the other of the lifts may be a column lift. The column lifts may be hydraulic jacks capable of extending and retracting. The column lifts may be like those described in U.S. Pat. No. 6,820,294, entitled "*Linkage for Lift/Lowering Control for A Patient Supporting Platform*," filed on Feb. 26, 2002, hereby incorporated herein by reference, or like those described in U.S. Pat. No. 7,395,564, entitled "*Articulated Support Surface for A Stretcher or Gurney*," filed on Mar. 24, 2006, hereby incorporated herein by reference. Another lift mechanism that can be used on the patient support apparatus 30 is shown in U.S. Patent Application Publication No. US2021/0177679A1, entitled "*Patient Support with Lift Assembly*," which is hereby incorporated herein by reference.

The actuators may be arranged at any suitable location to actuate the lifts. The actuators may include linear actuators, rotary actuators, or other types of actuators. The actuators may be electrically operated, hydraulic, electro-hydraulic, pneumatic, or the like. The actuators may include motors, gear trains, drive screws, nuts/lead screws, and the like, for actuation.

As will be described further below (see, e.g., FIG. 3), the patient support apparatus further includes a plurality of load cell assemblies 82 for measuring load distributed about or otherwise acting on the patient support surface 42. The plurality of load cell assemblies 82 may be interposed between a first mounting portion 84 and a second mounting portion 86 of the patient support apparatus 30. For example, the first mounting portion 84 of the patient support apparatus 30 may be one of the support structure 32 and the lift mechanism 70, and the second mounting portion 86 may be the other of the support structure 32 and the lift mechanism 70. However, as will be appreciated from the subsequent description below, other configurations are contemplated, and the load cell assemblies 82 may be operatively attached to various portions of the patient support apparatus 30 to measure, monitor, sense, or otherwise detect load on the patient support surface 42.

Figure 2:
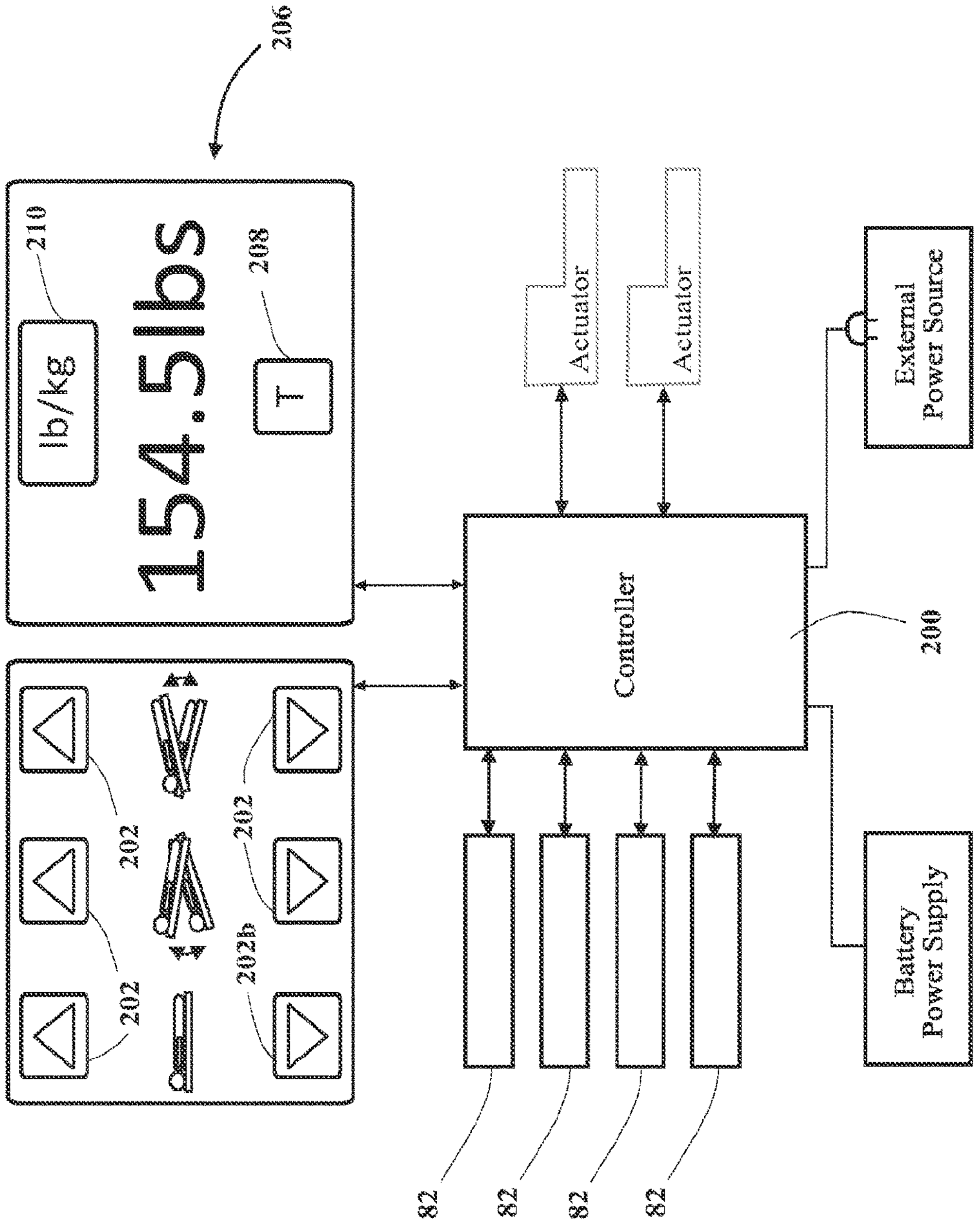
FIG. 2 is a schematic view of a control system.

Referring to FIG. 2, a control system with a controller 200 is shown. The controller 200 may have one or more processors for processing instructions or for processing algorithms stored in memory to control operation of the actuators to coordinate movement of the actuators of the lift mechanism 70 and or patient support deck 38 to evenly lift and lower the intermediate frame 36 relative to the base 34 and/or adjust the patient support deck 38 relative to the intermediate frame 36 (and/or other portions of the patient support apparatus 30 such as the base 34), and/or to independently operate actuators to place the intermediate frame 36 and/or the patient support deck 38 in a variety of patient positions such as a Trendelenburg position in which the head end and the foot end are at different heights relative to the base 34. Additionally or alternatively, the controller 200 may include one or more microcontrollers, microprocessors, field programmable gate arrays, systems on a chip, discrete circuitry, and/or other suitable hardware, software, or firmware that is capable of carrying out the functions described herein. The controller 200 may be carried on-board the patient support apparatus 30 or may be remotely located. In some versions, the controller 200 is mounted to the base 34. In some versions, the controller 200 is mounted to the footboard 54. Power to the actuators and/or the controller 200 may be provided by a battery power supply and/or an external power source.

The controller 200 is coupled to the actuators in a manner that allows the controller 200 to control the actuators. The controller 200 may communicate with the actuators via wired or wireless connections to perform one of more desired functions. The controller 200 may monitor a current state of the actuators via one or more sensors and determine desired states in which the actuators should be placed, based on one or more input signals that the controller 200 receives from one or more user input devices. The state of the actuators may be a position, a relative position, an angle, an energization status (e.g., on/off), or any other parameter of the actuators.

A user, such as a caregiver, may actuate one or more user input devices 202, which transmit corresponding input signals to the controller 200, and the controller 200 controls operation of the actuators based on the input signals. The user input devices 202 may include any device capable of being actuated by the user and may be provided on a control panel, touchscreen, or the like. The user input devices 202 may be configured to be actuated in a variety of different ways, including but not limited to, mechanical actuation (hand, foot, finger, etc.), hands-free actuation (voice, foot, etc.), and the like. The user input devices 202 may include buttons (such as buttons corresponding to lift, lower, normal Trendelenburg, and reverse Trendelenburg), a gesture sensing device for monitoring motion of hands, feet, or other body parts of the user (such as through a camera), a microphone for receiving voice activation commands, a foot pedal, and sensors (e.g., infrared sensor such as a light bar or light beam to sense a user's body part, ultrasonic sensors, capacitive sensors, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices may also be utilized. The user input devices may be located on one of the side rails 44, 46, 48, 50, the headboard 52, the footboard 54, or other suitable locations. The user input devices may also be located on a portable electronic device (e.g., iWatch®, iPhone®, iPad®, or similar electronic devices). Other configurations are contemplated.

The control system may also include or otherwise facilitate operation of a scale to indicate a patient's weight and/or to detect a patient's position/movement on the patient support apparatus 30, such as in conjunction with a bed exit (or pre-exit detection) alert system. In some versions, the scale includes the load cell assemblies 82 connected to the controller 200 to provide signals associated with loads measured by each of the load cell assemblies 82. For example, each load cell assembly 82 may include a pair of activation leads and a pair of sensor leads. The controller 200 may include a circuit in electrical communication with the activation leads to supply electrical power to the load cell assembly 82 via one of the activation leads with the other activation lead coupled to ground. The controller 200 may be in electrical communication with the sensor leads that provide output to the controller 200, wherein the output correlates to how much force is being exerted on the load cell assemblies 82. See, for example, the description of load cells in U.S. patent application Ser. No. 16/549,612, entitled "Angle Calibration Using Load Cells," filed Aug. 23, 2019, hereby incorporated herein by reference.

The output signals received from the load cell assemblies 82 via their sensor leads are collectively processed by the controller 200 using scale algorithms to determine, for example, a patient's weight to output to a display 206, as shown in FIG. 2. See, for example, the methods described in U.S. patent application Ser. No. 16/549,612, entitled "Angle Calibration Using Load Cells," incorporated by reference herein. The scale may include a tare function 208 and a converter 210 to switch between kilograms and pounds.

Figure 3:
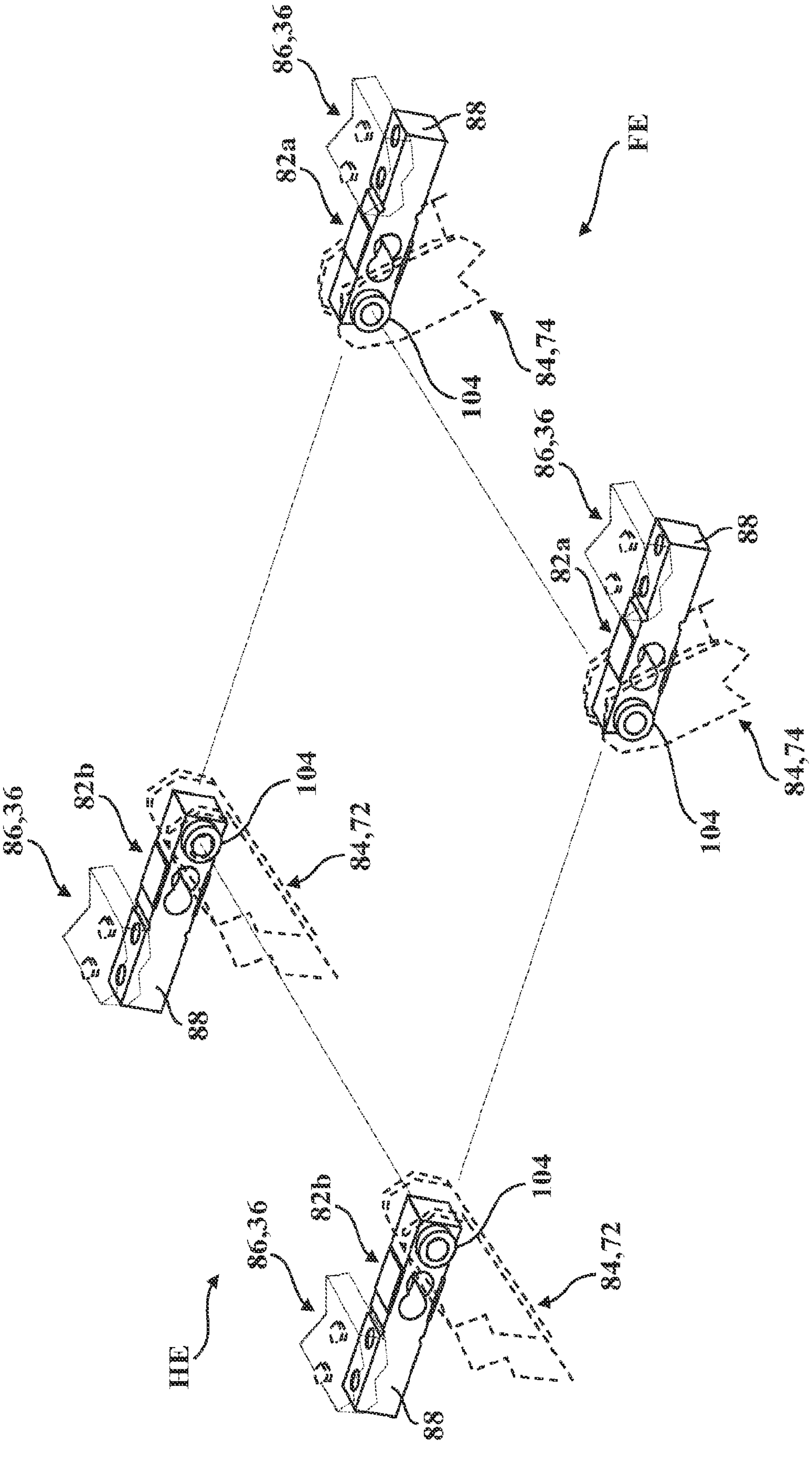
FIG. 3 is a perspective view of an arrangement of load cell assemblies within the patient support apparatus.

FIG. 3 illustrates one arrangement of the load cell assemblies 82 interposed between the first mounting portion(s) 84 and the second mounting portion(s) 86 of the patient support apparatus. For example, FIG. 3 shows the first mounting portion 84 defined as the support structure 32 of the patient support apparatus 30, and shows the second mounting portion 86 defined as the lift mechanism 70 of the patient support apparatus 30. However, as noted above, the first and second mounting portions 84, 86 may be defined by other portions of the patient support apparatus 30, such as by various parts of the support structure 32 and/or the lift mechanism 70. In the version shown in FIG. 3, a pair 82*a* of the load cell assemblies 82 are coupled to the head end lift 72, and a pair 82*b* of the load cell assemblies 82 are coupled to the foot end lift 74. In this configuration, the load cell assemblies 82 are arranged such that a load on the patient support deck 38 is transmitted via the intermediate frame 36 to the plurality of load cell assemblies 82 to measure the load. The load cell assemblies 82 may be mounted to the intermediate frame 36 using various components and/or structural features, including, but not limited to, brackets, pivot joints/shafts, fasteners, welding, and the like.

Figure 4A:
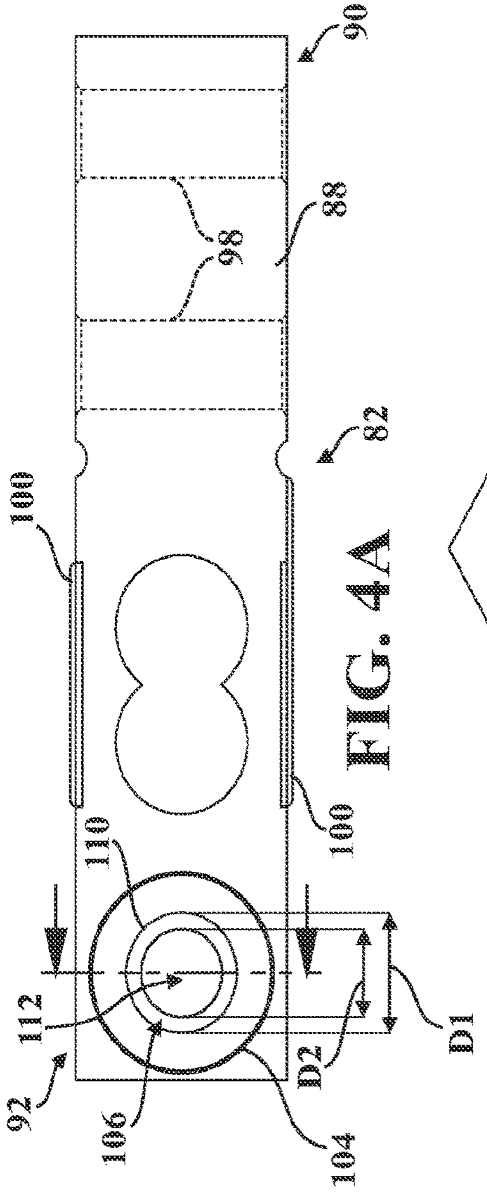
FIG. 4A is a side view of a body of a load cell assembly including a bushing.
Figure 4B:
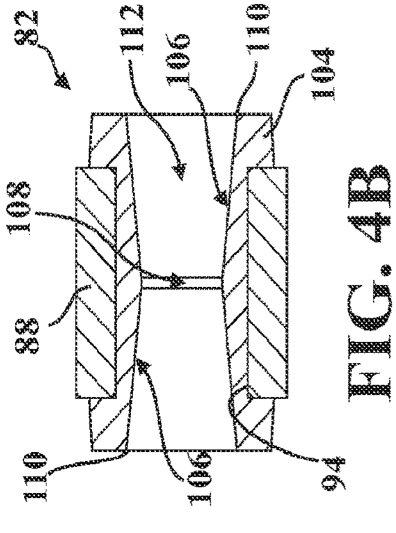
FIG. 4B is a cross-sectional view of the load cell assembly of FIG. 4A.
Figure 4C:
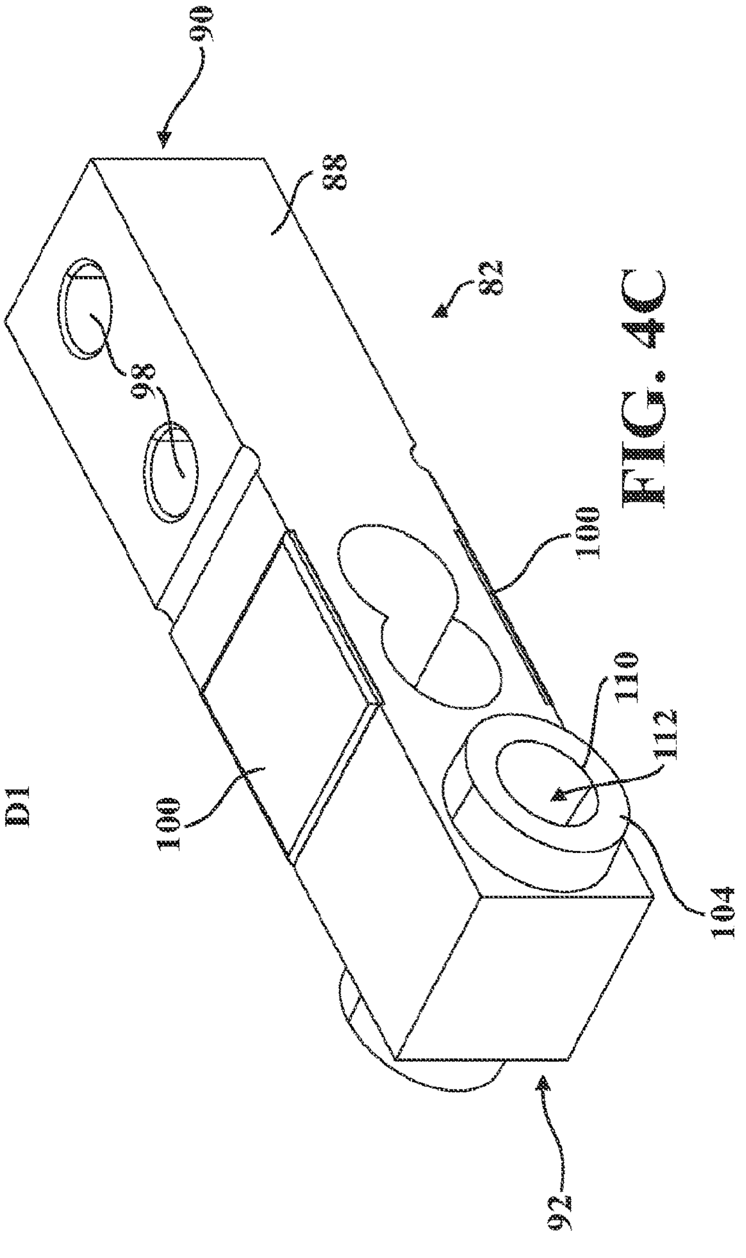
FIG. 4C is a top perspective view of the body of the load cell assembly of FIG. 4A.
Figure 5:
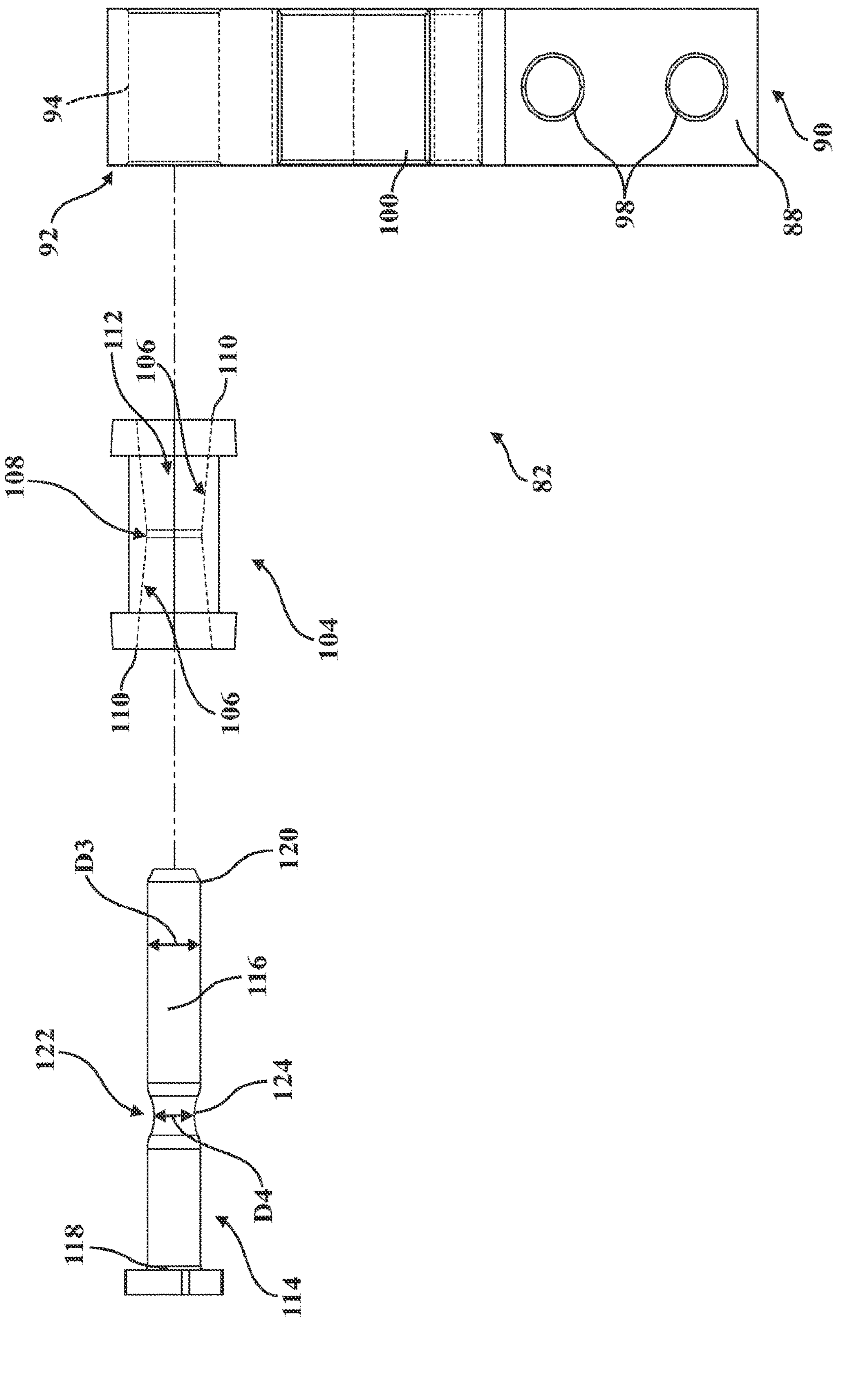
FIG. 5 is a partially exploded view of a shaft, the bushing, and the body of the load cell assembly.

Referring to FIGS. 3 through 5, each of the load cell assemblies 82 includes a body 88 extending between a first portion 90 and a second portion 92. The first portion 90 may be operatively attached to one of the first mounting portion 84 or the second mounting portion 86 of the patient support apparatus 30. For example, the first portion 90 of the body 88 may be operatively attached to the base 34 or the intermediate frame 36, or the lift mechanism 70. Additionally, the second portion 92 of the body 88 defines a bushing bore 94 configured to receive a bushing 104 (described in further detail below). In some versions, the load cell assemblies 82 may be of different types, shapes, sizes, resolutions, etc. In the representative version depicted in FIGS. 3 through 5, a beam type load cell assembly is shown. Here, the first portion 90 of the load cell assembly 82 includes a pair of bores 98 configured to receive fasteners to operatively attach the first portion 90 to the first or second mounting portions 84, 86 (e.g., the support structure 32 and/or the lift mechanism 70). As best shown in FIGS. 4A through 5, the load cell assemblies may include a load sensor 100 for measuring a load experienced by the body 88. Various types and arrangements of load sensors 100 for measuring a load experienced by the body 88 are contemplated by the present disclosure. For example, one or more strain gauges 102 may be coupled to body to measure a load experienced by the body 88. Other configurations are contemplated.

Referring to FIGS. 4A through 8D, the load cell assemblies 82 include a bushing 104 configured to be arranged in the bushing bore 94 of the body 88. The bushing 104 may be insert molded in the bushing bore 94, press fit into the bushing bore 94 (by first softening the bushing 104 and then inserting), formed in two pieces and fastened/adhered together in the bushing bore 94, or otherwise disposed in the bushing bore 94. The bushing 104 may be formed at least partially of, and/or coated with, resilient, low friction and/or low wear materials, e.g., PTFE, to facilitate movement of a shaft 114 (described in further detail below) in the bushing 104.

As is described in greater detail below, the bushing 104 is shaped and configured to minimize side loads and twisting of the load cell assemblies 82. Particularly, the bushing 104 may define opposing tapered regions 106 and a central region 108 disposed between the tapered regions 106. In some configurations, the bushing 104 may define a pair of side openings 110 and a shaft passage 112 extending between the side openings 110. In this configuration, the central region 108 may be located along the shaft passage 112 between the pair of side openings 110. For example, the central region 108 may be located midway through the shaft passage 112 and has a width of less than 50% of a length of the shaft passage 112, less than 30% of the length of the shaft passage 112, or less than 10% of the length of the shaft passage 112. The central region 108 may define a plane long which the tapered regions 106 converge and at which loads may be concentrated. In some versions, the central region 108 has a width of less than 1.0 inches, less than 0.6 inches, less than 0.4 inches, or less than 0.3 inches. Accordingly, the central region 108 represents a relatively narrow region within the shaft passage 110 at which loads are ideally applied to the load cell assemblies 82. The central region 108 may be provided with or otherwise define various shapes, profiles, and the like (e.g., curved, flat, pointed, and the like). Other configurations are contemplated.

Figure 6:
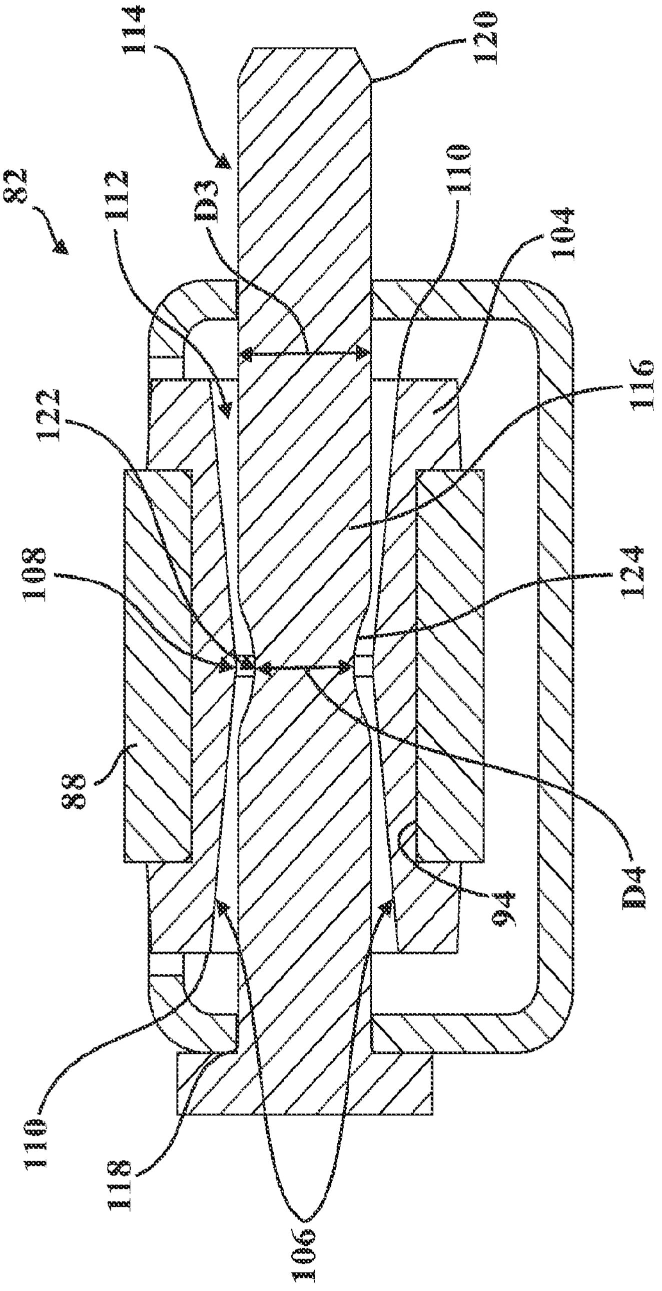
FIG. 6 is a cross-sectional view of the load cell assembly coupled to a mounting portion of the patient support apparatus and in an aligned configuration.

Referring to FIGS. 4B and 6, the shaft passage 112 defines the opposing tapered regions 106 of the bushing 104. Here, each of the pair of side openings 110 defines a first diameter D1, and the central region 108 of the shaft passage 112 defines a second diameter D2. The second diameter D2 is be smaller than the first diameter D1 to define the taper of the tapered regions 106. The taper of the tapered regions 106 may form an angle α of at least 3 degrees, at least 5 degrees, at least 10 degrees, or at least 15 degrees relative to a central axis of the shaft passage 112. The taper between the side openings 110 and the central region 108 provides free space to receive the shaft 114 in the event that tilting of the shaft 114 relative to the central axis occurs in the shaft passage 112. This free space allows the shaft 114 to tilt to at least a limited extent before causing twisting loads to be realized by the body 88 of the load cell assembly 82.

The load cell assemblies 82 each include a shaft 114. Referring to FIG. 5 and FIG. 6, the shaft 114 is configured to be received in the shaft passage 112 of the bushing 104 to operatively attach one of the support structure 32 and/or the lift mechanism 70 to the body 88 of the load cell assembly. The shaft 114 extends along a shank 116 between a first shank end 118 and a second shank end 120. The shank 116 defines a third diameter D3 that is smaller than the second diameter D2 of the central region 108 of the bushing 104. Referring specifically to FIG. 6, the shaft 114 is configured to be received by the shaft passage 112 and engage a portion of the patient support apparatus 30 (for example the first mounting portion 84 or the second mounting portion 86) to operatively attach the portion of the patient support apparatus 30 to the load cell assembly 82.

Referring to FIGS. 5 through 7B, the shaft 114 defines a reduced diameter region 122. The reduced diameter region 122 is arranged between the first shank end 118 and the second shank end 120 of the shaft 114. The reduced diameter region 122 may be defined by a necked profile 124. The reduced diameter region 122 defines a fourth diameter D4 that is smaller than the third diameter D3 of the shank 116. Here, for example, a ratio taken between the third diameter D3 and the fourth diameter D4 may be greater than about 1.25:1. In some versions, the diameter of the reduced diameter region 122 may decrease from the third diameter D3 to the fourth diameter D4 non-linearly (as shown in the Figures). Other configurations are contemplated.

The reduced diameter region 122 is arranged to engage the central region 108 of the bushing 104 such that when the reduced diameter region 122 of the shaft 114 engages the central region 108 of the bushing 104, the reduced diameter region 122 of the shaft 114 is urged into alignment with the central region 108 of the bushing 104. This arrangement of the reduced diameter region 122 relative to the central region 108 allows for both limited pivoting and translational movement of the shaft 114 relative to the bushing 104. For example, if a load on the patient support deck 38 is shifted, loads applied to the plurality of load cell assemblies 82 will accordingly be shifted. Thus, allowing limited movement of the shaft 114 relative to the bushing 104 allows for limited shifting within the load cell assemblies 82 while ensuring that the load cell assemblies 82 do not mechanically bind and cause inaccurate readings. Furthermore, the urging afforded between the shaft 114 and the bushing 104 also helps bring the load cell assemblies 82 back into alignment when load on the patient support deck 38 subsequently shifts.

Figure 7C:
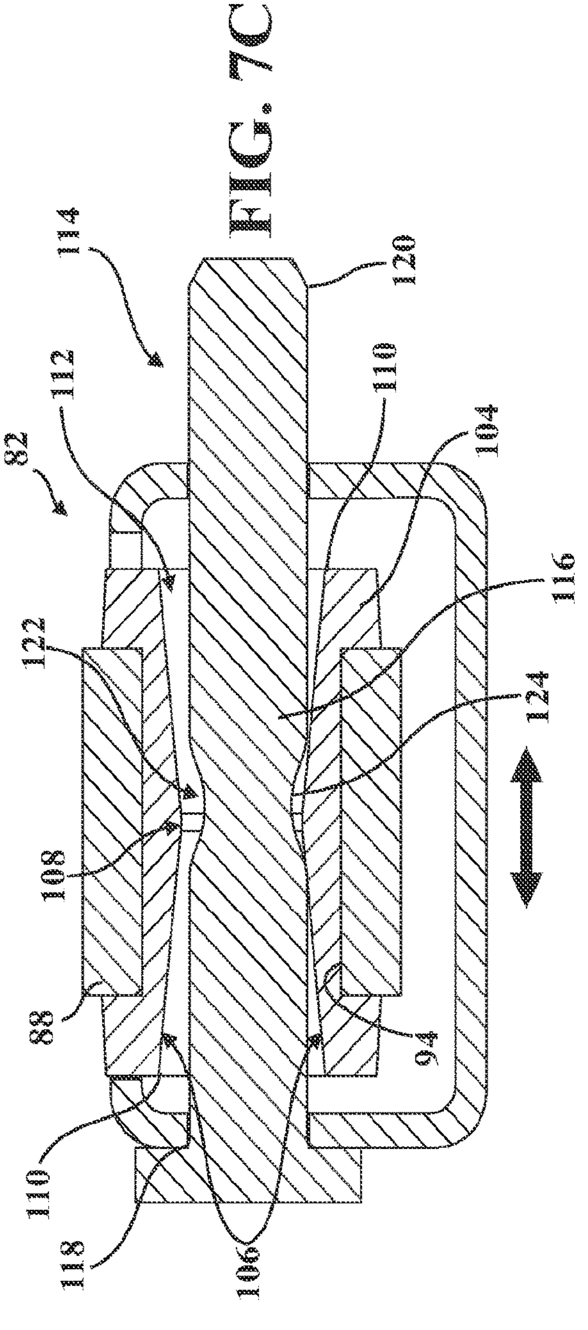
Figure 7D:
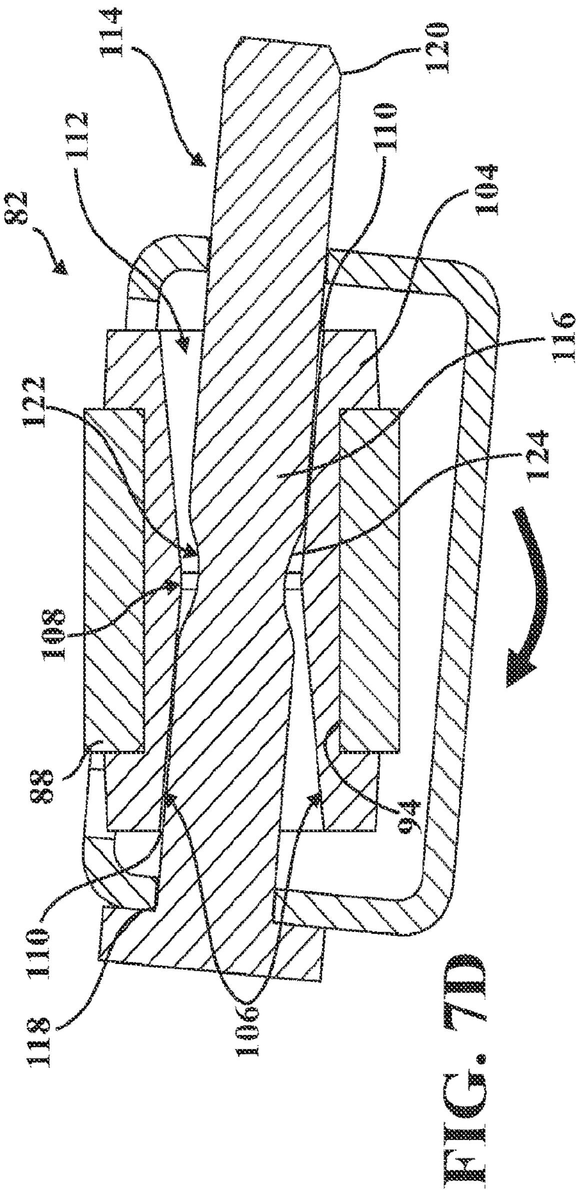

Referring to FIGS. 6 through 7D, cross-sections of a load cell assembly 82 are shown, and FIG. 6 depicts a cross-section where the shaft 114 is aligned with the bushing 104. In this scenario, the reduced diameter region 122 of the shaft 114 and the central region 108 of the bushing 104 are aligned. However, in the cross-sections depicted in FIGS. 7A through 7D, the shaft 114 is shown shifted relative to the bushing 104 in response to load shifting about or otherwise acting differently on the patient support deck 38 (or, more generally, load shifting between the first and second mounting portions 84, 86). In FIGS. 7A through 7B, for example, the load on the patient support deck 38 may shift from a head end of the patient support deck 38 to a foot end of the patient support deck 38, causing one or more of the shafts 114 of the load cell assemblies 82 to translate up or down as a result of the changing load. In this scenario, the central region 108 of the bushing 104 engages the reduced diameter region 122 of the shaft 114 to ensure that the reduced diameter region 122 remains aligned with the central region 108 and to further ensure that that further translation/pivoting of the shaft 114 relative to the bushing 104 limited.

Referring to FIG. 7C, if the shaft 114 translates left or right relative to the bushing 104, the reduced diameter region 122 will be misaligned from the central region 108. Accordingly, the cooperating geometry of the reduced diameter region 122 and the central region 108 urges the reduced diameter region 122 and the central region 108 back into or otherwise towards alignment (e.g., to the arrangement depicted in FIG. 6). Here, the tapered region(s) of the bushing 104 engage the necked profile 124 of the reduced diameter region 122 of the shaft 114 to limit further translation of the shaft 114 relative to the bushing 104, and exert force on the necked profile 124 which urges the reduced diameter region 122 back into or otherwise towards alignment with the central region 108. Similarly, referring to FIG. 7D, if the shaft 114 pivots relative to the bushing 104, the reduced diameter region 122 will be misaligned from the central region 108. Here too, the cooperating geometry of the reduced diameter region 122 and the central region 108 urges the reduced diameter region 122 and the central region 108 back into or otherwise towards alignment. More specifically, the tapered region(s) of the bushing 104 engage the necked profile 124 of the reduced diameter region 122 of the shaft 114 to limit further pivoting of the shaft 114 relative to the bushing 104, and exert force on the necked profile 124 to urge the reduced diameter region 122 back into or otherwise towards alignment with the central region 108.

Figure 8:
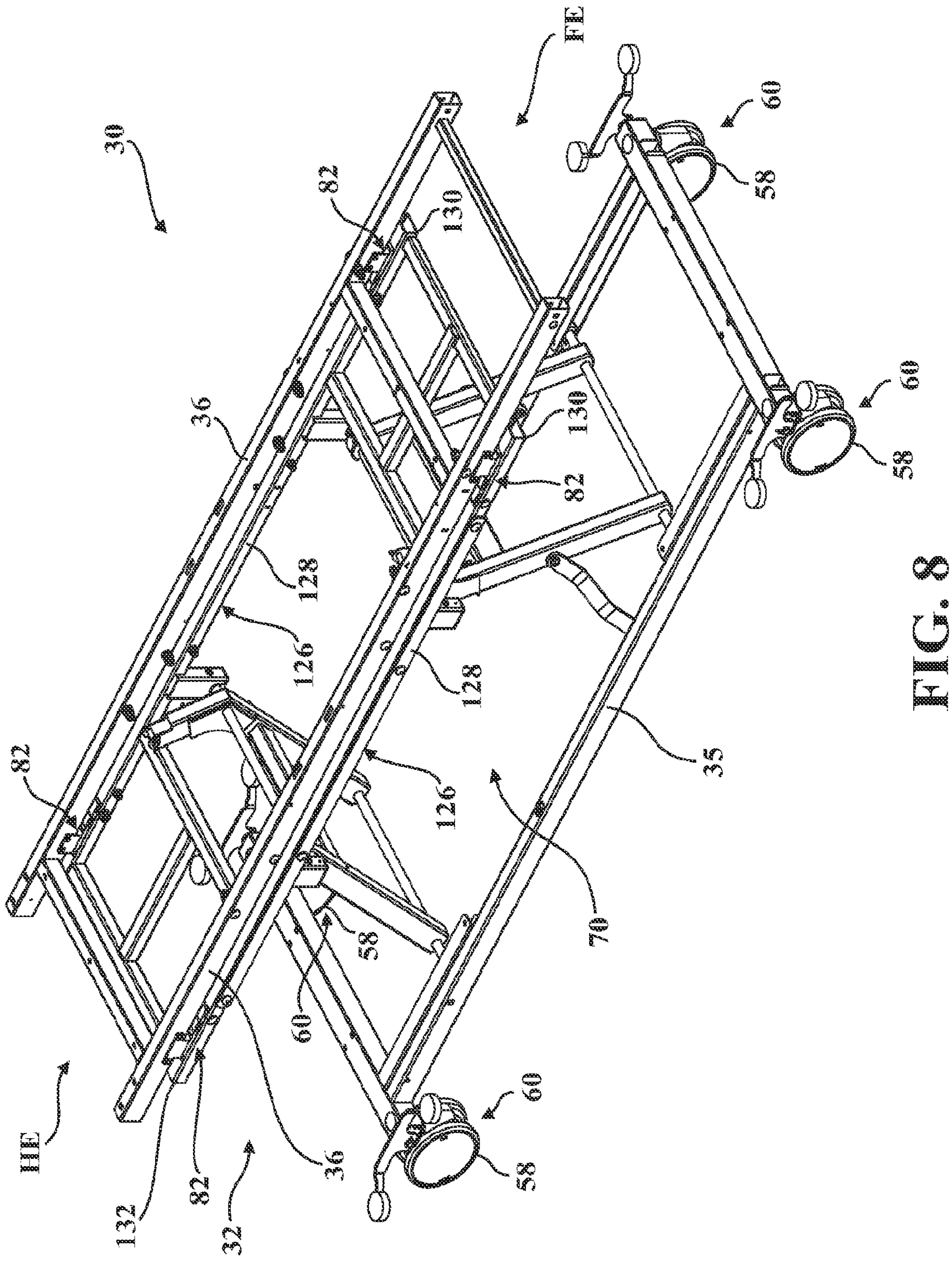
FIG. 8 is a perspective view of a patient support apparatus including a weigh frame.
Figure 9:
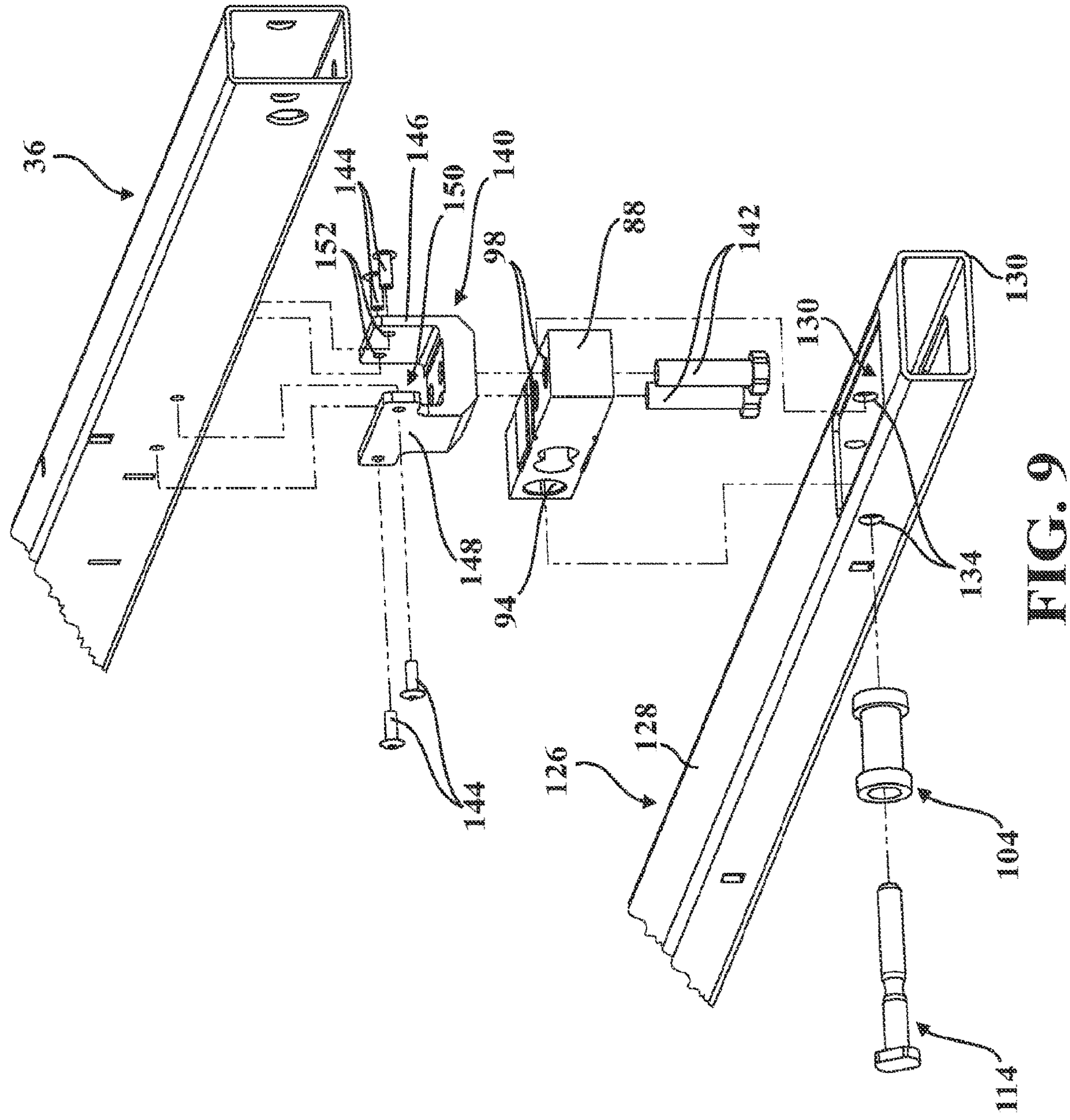
FIG. 9 is an exploded view illustrating a load cell assembly interposed between the weigh frame and an intermediate frame of the patient support apparatus.
Figure 10:
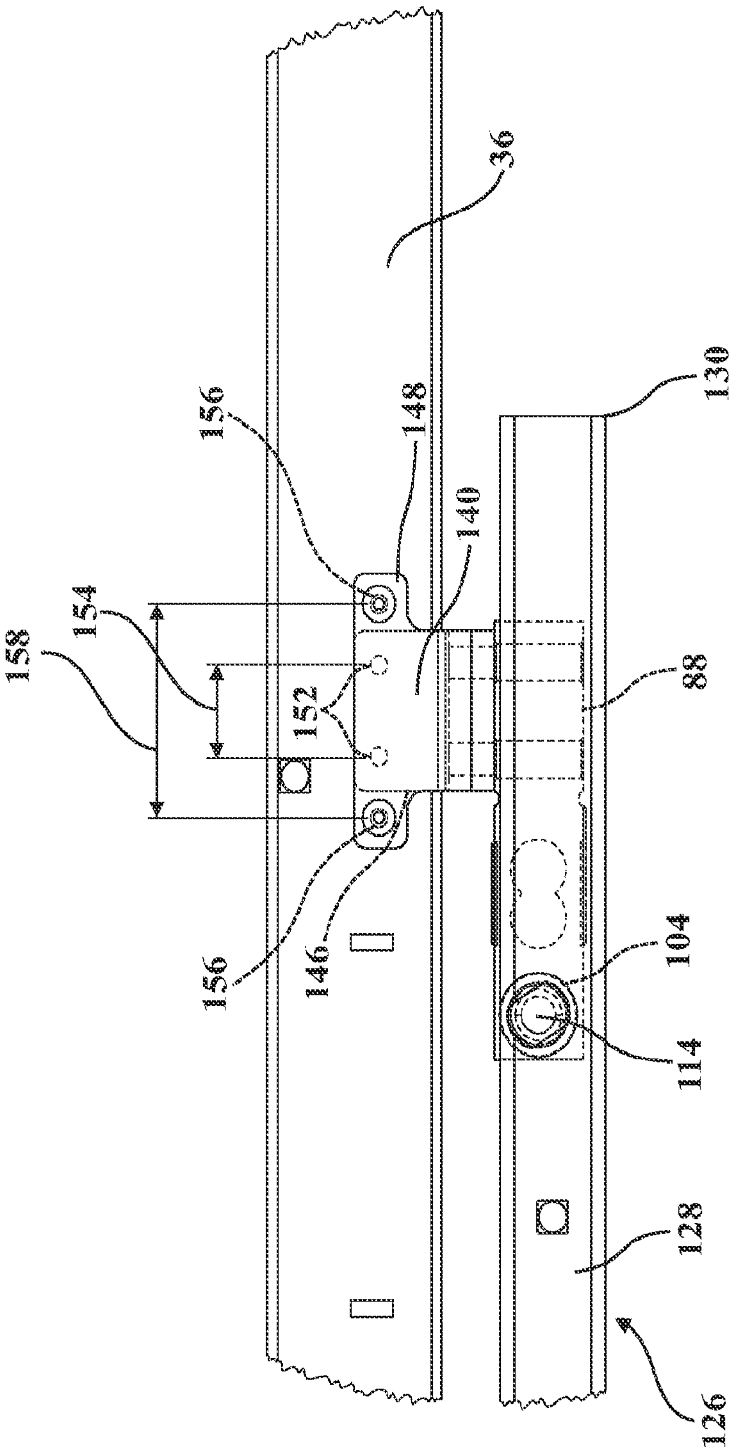
FIG. 10 is a partial side view of the patient support apparatus showing the load cell assembly interposed between the weigh frame and the intermediate frame and coupled to the intermediate frame with a mounting bracket.

Referring now to FIGS. 8 through 10, the patient support apparatus 30 may further include a weigh frame 126. The weigh frame 126 may be interposed between the support structure 32 and the lift mechanism 70. For example, the configuration illustrated in FIG. 8 shows the weigh frame 126 interposed between, and operatively attached to, the intermediate frame 36 and the lift mechanism 70. In this version, the intermediate frame 36 is spaced above the weigh frame 126. However, any suitable arrangement of interposing the weigh frame between the lift mechanism 70 and a component of the support structure 32 is contemplated. For example, the weigh frame 126 may be interposed between the base frame 35 and the lift mechanism 70. Further, when the patient support apparatus 30 is configured with a weigh frame 126, each of the load cell assemblies 82 may be operatively attached to the weigh frame 126 and to some other portion of the patient support apparatus 30. In some versions, the patient support apparatus 30 may be configured without a discrete weigh frame 126, such as where the load cells assemblies 82 are operatively attached to components of the lift mechanism 70, either adjacent to the base frame 35 or adjacent to the intermediate frame 36. Other configurations are contemplated. As explained above, while the load cell assemblies 82 can be interposed between any first mounting portion 84 and second mounting portion 86 of the patient support apparatus, the addition of a weigh frame 126 provides for a dedicated structural member for perceiving a load on the patient support deck 38.

Referring to FIG. 8, the illustrated weigh frame 126 includes a weigh frame rail 128. The weigh frame rail 128 extends between a first weigh frame end 130 and a second weigh frame end 132. In some versions, weigh frame rails 128 of the weigh frame 126 may each define a plurality of weigh frame apertures 134 arranged to receive one of the shafts 114 to operatively attach one of the load cell assemblies 82 to the weigh frame 126. The weigh frame apertures 134 may be disposed adjacent to the first weigh frame end 130, and the weigh frame 126 may further define second weigh frame apertures (not shown) disposed adjacent to the second weigh frame end 132 to receive another shaft 114 to operatively attach another one of the load cell assemblies 82 to the weigh frame 126. The weigh frame rail 128 may also define rail pockets 138 disposed adjacent to each of the first weigh frame end 130 and/or the second weigh frame end 132 that are sized receive at least a portion of the body 88 of one of the load cell assemblies 82. Notably, the weigh frame apertures 134 may define any suitable shape to receive the shaft 114, including, but not limited to, circular, rectangular, or an elongated profile extending between U-shaped ends (e.g., an oval and/or rounded rectangular profile; not shown in detail). It will be appreciated that the weigh frame 126 may be configured in various ways, with or without discrete rails 128 as described and illustrated herein. Other configurations are contemplated.

FIG. 9 shows an exploded view of an example arrangement for interposing one of the load cell assemblies 82 between the weigh frame 126 and the intermediate frame 36. Here, the bushing 104 is arranged in the bushing bore 94 of the body 88 which, in turn, is at least partially disposed in the rail pocket such that the bushing 104 is aligned with the weigh frame apertures 134. The shaft 114 is disposed through the weigh frame apertures 134 and the bushing 104 to operatively attach the body 88 of the load cell assembly 82 to the weigh frame rail 128. Additionally, the load cell assembly 82 may further include a mounting bracket 140, which may be configured as is described in greater detail below. It will be appreciated that the mounting bracket 140 may be coupled to the body 88 in various ways. For example, the mounting bracket 140 may be coupled to the body 88 using fasteners 142 disposed through the pair of bores 98 of the body 88. Similarly, the mounting bracket 140 may be coupled to the intermediate frame 36 (or other portions of the patient support apparatus 30) in other ways, such as using rivets 144. Other configurations are contemplated.

In versions other than those illustrated in connection with FIGS. 9 and 10, the mounting bracket 140 may be configured to operatively attach the load cell assembly 82 to other mounting portions 84, 86 of the patient support apparatus 30, such as the support structure 32 (including the intermediate frame 36, as discussed above), the lift mechanism 70, or the weigh frame 126. Other configurations are contemplated.

With continued reference to FIGS. 9 and 10, in the illustrated version, the mounting bracket 140 of each of the plurality of load cell assemblies 82 includes a first mounting tab 146 and a second mounting tab 148. The second mounting tab 148 is spaced from the first mounting tab 146 to define a channel 150 therebetween. The channel 150 is shaped to receive a portion of one of the support structure 32, the lift mechanism 70, and the weigh frame 126 to operatively attach to the body 88 of the load cell assembly 82 to one of the support structure 32, the lift mechanism 70, and the weigh frame 126. In the illustrated versions, the channel 150 is shaped to receive a portion of the intermediate frame 36. However, other configurations are contemplated.

Referring to FIG. 10, in the illustrated version, the first mounting tab 146 of the mounting bracket 140 defines a first pair of coupling bores 152 spaced from each other at a first distance 154, and the second mounting tab 148 defines a second pair of coupling bores 156 spaced from each other at a second distance 158. The second distance 158 is greater than the first distance 154. For example, in some configurations, a ratio taken between the second distance and the first distance is at least 1.5:1. Additionally, the first pair of coupling bores 152 are arranged between the second pair of coupling bores 156 in the illustrated version. For example, FIG. 10 shows the first pair of coupling bores 152 and the second pair of coupling bores 156 arranged such that the first pair of coupling bores 152 are disposed between the second pair of coupling bores 156 when viewing the mounting bracket 140 from the side. The first and second pair of coupling bores 152, 156 are configured to receive respective fasteners (including any suitable fastener such as, but not limited to, the rivets 144) to operatively attach the mounting bracket 140 to one of the support structure 32, the lift mechanism 70, and the weigh frame 126. This arrangement affords significant strength and rigidity between the mounting bracket 140 and the portions of the patient support apparatus 30 to which it is coupled via fasteners.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient support apparatus comprising:
- a support structure including:
  - a base arranged for movement about floor surfaces,
  - an intermediate frame, and
  - a patient support deck operatively attached to the intermediate frame and defining a patient support surface;
- a lift mechanism configured to move the patient support deck between a plurality of vertical configurations relative to the base; and
- a plurality of load cell assemblies interposed between the support structure and the lift mechanism to measure load about the patient support surface, the plurality of load cell assemblies each respectively including:
  - a body operatively attached to one of the support structure and the lift mechanism and defining a bushing bore,
  - a bushing arranged in the bushing bore and defining opposing tapered regions and a central region disposed between the tapered regions, and
  - a shaft operatively attached to the other of the support structure and the lift mechanism, the shaft being configured to be received by the bushing and defining a reduced diameter region arranged to engage the central region of the bushing to urge the reduced diameter region of the shaft into alignment with the central region of the bushing and to permit limited pivoting and translational movement between the shaft and the bushing in response to load shifting between the plurality of load cell assemblies.

II. The patient support apparatus of clause I, further including a weigh frame interposed between the support structure and the lift mechanism, with each of the plurality of load cell assemblies operatively attached to the weigh frame.

III. The patient support apparatus of clause II, wherein each of the plurality of load cell assemblies are operatively attached to the intermediate frame.

IV. The patient support apparatus of any of clauses II-III, wherein the intermediate frame is spaced above the weigh frame.

V. The patient support apparatus of any of clauses II-IV, wherein the weigh frame includes a weigh frame rail defining a weigh frame aperture to receive the shaft of one of the plurality of load cell assemblies to operatively attach at least one of the plurality of load cell assemblies to the weigh frame.

VI. The patient support apparatus of clause V, wherein the weigh frame rail extends between a first weigh frame end and a second weigh frame end with the weigh frame aperture disposed adjacent to the first weigh frame end; and wherein the weigh frame rail further defines a second weigh frame aperture disposed adjacent to the second weigh frame end to receive the shaft of another of the plurality of load cell assemblies.

VII. The patient support apparatus of any of clauses V-VI, wherein the weigh frame aperture defines an elongated profile extending between U-shaped ends.

VIII. The patient support apparatus of any of clauses V-VII, wherein the weigh frame rail defines a rail pocket sized to receive at least a portion of the body of one of the plurality of load cell assemblies.

IX. The patient support apparatus of clause II, wherein each of the plurality of load cell assemblies further includes a mounting bracket coupled to the body of the load cell assembly, the mounting bracket configured to operatively attach the load cell assembly to one of the support structure, the lift mechanism, and the weigh frame.

X. The patient support apparatus of clause IX, wherein the mounting bracket of each of the plurality of load cell assemblies includes a first mounting tab and a second mounting tab spaced from the first mounting tab to define a channel therebetween, the channel shaped to receive a portion of one of the support structure, the lift mechanism, and the weigh frame to operatively attach to the body of the load cell assembly to one of the support structure, the lift mechanism, and the weigh frame.

XI. The patient support apparatus of clause X, wherein the first mounting tab defines a first pair of coupling bores spaced from each other at a first distance, and the second mounting tab defines a second pair of coupling bores spaced from each other at a second distance greater than the first distance, wherein the first and second pair of coupling bores are configured to receive respective fasteners to operatively attach the mounting bracket to one of the support structure, the lift mechanism, and the weigh frame.

XII. The patient support apparatus of clause XI, wherein a ratio taken between the second distance and the first distance is at least 1.5:1.

XIII. The patient support apparatus of any of clauses XI-XII, wherein the first pair of coupling bores are arranged longitudinally between the second pair of coupling bores.

XIV. The patient support apparatus of any of clauses XI-XIII, wherein each of the plurality of load cell assemblies further includes a mounting bracket coupled to the body of the load cell assembly, the mounting bracket configured to operatively attach the load cell assembly to one of the support structure and the lift mechanism.

XV. The patient support apparatus of clause XIV, wherein the mounting bracket of each of the plurality of load cell assemblies includes a first mounting tab and a second mounting tab spaced from the first mounting tab to define a channel therebetween, the channel shaped to receive a portion of one of the support structure and the lift mechanism to operatively attach to the body of the load cell assembly to one of the support structure and the lift mechanism.

XVI. The patient support apparatus of clause XV, wherein the first mounting tab defines a first pair of coupling bores spaced from each other at a first distance, and the second mounting tab defines a second pair of coupling bores spaced from each other at a second distance greater than the first distance, wherein the first and second pair of coupling bores are configured to receive respective fasteners to operatively attach the mounting bracket to one of the support structure and the lift mechanism.

XVII. The patient support apparatus of clause XVI, wherein a ratio taken between the second distance and the first distance is at least 1.5:1.

XVIII. The patient support apparatus of any of clauses XVI-XVII, wherein the first pair of coupling bores are arranged longitudinally between the second pair of coupling bores.

XIX. The patient support apparatus of any of clauses I-XVIII, wherein the bushing defines a pair of side openings and a shaft passage extending between the pair of side openings with the central region located along the shaft passage between the pair of side openings; and wherein each of the pair of side openings defines a first diameter and the central region of the shaft passage defines a second diameter, the second diameter being smaller than the first diameter.

XX. The patient support apparatus of clause XIX, wherein the shaft extends along a shank between a first shank end and a second shank end with the shank defining a third diameter that is smaller than the second diameter of the central region; and wherein the reduced diameter region is arranged between the first shank end and the second shank end.

XXI. The patient support apparatus of clause XX, wherein the reduced diameter region defines a fourth diameter that is smaller than the third diameter.

XXII. The patient support apparatus of clause XXI, wherein a ratio taken between the third diameter and the fourth diameter is at least 1.25:1.

XXIII. The patient support apparatus of any of clauses XXI-XXII, wherein the reduced diameter region is defined by a necked profile.

XXIV. The patient support apparatus of any of clauses I-XXIII, wherein the bushing is comprised of a resilient material.

XXV. A load cell assembly configured to be interposed between a first mounting portion and a second mounting portion of a patient support apparatus, the load cell assembly comprising:

a body having a first portion configured to be operatively attached to the first mounting portion of the patient support apparatus and a second portion defining a bushing bore;

a bushing arranged in the bushing bore and defining a pair of side openings and a shaft passage extending between the pair of side openings with a central region located along the shaft passage between the pair of side openings, wherein each of the pair of side openings defines a first diameter and the central region of the shaft passage defines a second diameter, the second diameter being smaller than the first diameter; and a shaft extending along a shank between a first shank end and a second shank end, the shaft configured to be received by the bushing and operatively attached to the second mounting portion of the patient support apparatus, the shaft defining a reduced diameter region that is arranged between the first shank end and the second shank end to engage the central region of the bushing to urge the reduced diameter region of the shaft into alignment with the central region of the bushing and to permit limited pivoting and translational movement between the shaft and the bushing in response to load shifting on the patient support apparatus.

XXVI. The patient support apparatus of clause XXV, wherein the shank defines a third diameter that is smaller than the second diameter of the central region.

XXVII. The patient support apparatus of clause XXVI, wherein the reduced diameter region defines a fourth diameter that is smaller than the third diameter.

XXVIII. The patient support apparatus of any of clauses XXV-XXVII, wherein the bushing is comprised of a resilient material.

XXIX. A patient support apparatus comprising:

a support structure including:

- a base arranged for movement about floor surfaces,
- an intermediate frame, and
- a patient support deck operatively attached to the intermediate frame and defining a patient support surface;

a lift mechanism configured to move the patient support deck between a plurality of vertical configurations relative to the base; and a plurality of load cell assemblies to measure load about the patient support surface, each of the load cell assemblies including:

a body having a first portion configured to be operatively attached to a first mounting portion of the patient support apparatus and a second portion defining a bushing bore, a bushing arranged in the bushing bore and defining a pair of side openings and a shaft passage extending between the pair of side openings with a central region located along the shaft passage between the pair of side openings, wherein each of the pair of side openings defines a first diameter and the central region of the shaft passage defines a second diameter, the second diameter being smaller than the first diameter, and a shaft extending along a shank between a first shank end and a second shank end, the shaft configured to be received by the bushing and operatively attached to a second mounting portion of the patient support apparatus, the shaft defining a reduced diameter region that is arranged between the first shank end and the second shank end to engage the central region of the bushing to urge the reduced diameter region of the shaft into alignment with the central region of the bushing and to permit limited pivoting and translational movement between the shaft and the bushing in response to load shifting on the patient support apparatus.

XXX. The patient support apparatus of clause XXIX, wherein the first mounting portion of the patient support apparatus is one of the support structure and the lift mechanism, and the second mounting portion is the other of the support structure and the lift mechanism.

What is claimed is:

1. A patient support apparatus comprising:

a support structure including:

a base arranged for movement about floor surfaces, an intermediate frame, and a patient support deck operatively attached to the intermediate frame and defining a patient support surface;

a lift mechanism configured to move the patient support deck between a plurality of vertical configurations relative to the base; and a plurality of load cell assemblies interposed between the support structure and the lift mechanism to measure load about the patient support surface, the plurality of load cell assemblies each respectively including:

a body operatively attached to one of the support structure and the lift mechanism and defining a bushing bore, a bushing arranged in the bushing bore and defining opposing tapered regions and a central region disposed between the tapered regions, and a shaft operatively attached to the other of the support structure and the lift mechanism, the shaft being configured to be received by the bushing and defining a reduced diameter region arranged to engage the central region of the bushing to urge the reduced diameter region of the shaft into alignment with the central region of the bushing and to permit limited pivoting and translational movement between the shaft and the bushing in response to load shifting between the plurality of load cell assemblies.

2. The patient support apparatus of claim 1, further including a weigh frame interposed between the support structure and the lift mechanism, with each of the plurality of load cell assemblies operatively attached to the weigh frame.

3. The patient support apparatus of claim 2, wherein each of the plurality of load cell assemblies are operatively attached to the intermediate frame.

4. The patient support apparatus of claim 2, wherein the intermediate frame is spaced above the weigh frame.

5. The patient support apparatus of claim 2, wherein the weigh frame includes a weigh frame rail defining a weigh frame aperture to receive the shaft of one of the plurality of load cell assemblies to operatively attach at least one of the plurality of load cell assemblies to the weigh frame.

6. The patient support apparatus of claim 5, wherein the weigh frame rail extends between a first weigh frame end and a second weigh frame end with the weigh frame aperture disposed adjacent to the first weigh frame end; and wherein the weigh frame rail further defines a second weigh frame aperture disposed adjacent to the second weigh frame end to receive the shaft of another of the plurality of load cell assemblies.

7. The patient support apparatus of claim 5, wherein the weigh frame aperture defines an elongated profile extending between U-shaped ends.

8. The patient support apparatus of claim 5, wherein the weigh frame rail defines a rail pocket sized to receive at least a portion of the body of one of the plurality of load cell assemblies.

9. The patient support apparatus of claim 2, wherein each of the plurality of load cell assemblies further includes a mounting bracket coupled to the body of the load cell assembly, the mounting bracket configured to operatively attach the load cell assembly to one of the support structure, the lift mechanism, and the weigh frame.

10. The patient support apparatus of claim 9, wherein the mounting bracket of each of the plurality of load cell assemblies includes a first mounting tab and a second mounting tab spaced from the first mounting tab to define a channel therebetween, the channel shaped to receive a portion of one of the support structure, the lift mechanism, and the weigh frame to operatively attach to the body of the load cell assembly to one of the support structure, the lift mechanism, and the weigh frame; and wherein the first mounting tab defines a first pair of coupling bores spaced from each other at a first distance, and the second mounting tab defines a second pair of coupling bores spaced from each other at a second distance greater than the first distance, wherein the first and second pair of coupling bores are configured to receive respective fasteners to operatively attach the mounting bracket to one of the support structure, the lift mechanism, and the weigh frame.

11. The patient support apparatus of claim 1, wherein each of the plurality of load cell assemblies further includes a mounting bracket coupled to the body of the load cell assembly, the mounting bracket configured to operatively attach the load cell assembly to one of the support structure and the lift mechanism.

12. The patient support apparatus of claim 11, wherein the mounting bracket of each of the plurality of load cell assemblies includes a first mounting tab and a second mounting tab spaced from the first mounting tab to define a channel therebetween, the channel shaped to receive a portion of one of the support structure and the lift mechanism to operatively attach to the body of the load cell assembly to one of the support structure and the lift mechanism.

13. The patient support apparatus of claim 12, wherein the first mounting tab defines a first pair of coupling bores spaced from each other at a first distance, and the second mounting tab defines a second pair of coupling bores spaced from each other at a second distance greater than the first distance, wherein the first and second pair of coupling bores are configured to receive respective fasteners to operatively attach the mounting bracket to one of the support structure and the lift mechanism.

14. The patient support apparatus of claim 13, wherein a ratio taken between the second distance and the first distance is at least 1.5:1.

15. The patient support apparatus of claim 13, wherein the first pair of coupling bores are arranged longitudinally between the second pair of coupling bores.

16. The patient support apparatus of claim 1, wherein the bushing defines a pair of side openings and a shaft passage extending between the pair of side openings with the central region located along the shaft passage between the pair of side openings; and wherein each of the pair of side openings defines a first diameter and the central region of the shaft passage defines a second diameter, the second diameter being smaller than the first diameter.

17. The patient support apparatus of claim 16, wherein the shaft extends along a shank between a first shank end and a second shank end with the shank defining a third diameter that is smaller than the second diameter of the central region; and wherein the reduced diameter region is arranged between the first shank end and the second shank end.

18. The patient support apparatus of claim 17, wherein the reduced diameter region defines a fourth diameter that is smaller than the third diameter.

19. The patient support apparatus of claim 18, wherein a ratio taken between the third diameter and the fourth diameter is at least 1.25:1.

20. The patient support apparatus of claim 18, wherein the reduced diameter region is defined by a necked profile.

* * * * *